United States Patent
Jalleh et al.

(10) Patent No.: US 11,275,800 B2
(45) Date of Patent: Mar. 15, 2022

(54) GAUGING CREDIBILITY OF DIGITAL CONTENT ITEMS

(71) Applicant: International Business Machines Corporation, Armonk, NY (US)

(72) Inventors: Sean G. Jalleh, Round Rock, TX (US); Amanda C. Maderic, Austin, TX (US); Andrew P. Mankins, Austin, TX (US); David L. Schwartz, Austin, TX (US); Lila Title, Scarsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/696,716

(22) Filed: Nov. 26, 2019

(65) Prior Publication Data

US 2020/0097511 A1 Mar. 26, 2020

Related U.S. Application Data

(63) Continuation of application No. 14/614,042, filed on Feb. 4, 2015, now Pat. No. 10,552,493.

(51) Int. Cl.
*G06F 16/951* (2019.01)
*G06F 16/215* (2019.01)

(52) U.S. Cl.
CPC .......... *G06F 16/951* (2019.01); *G06F 16/215* (2019.01)

(58) Field of Classification Search
CPC .............................. G06F 16/951; G06F 16/215
See application file for complete search history.

(56) References Cited

U.S. PATENT DOCUMENTS

| | | | |
|---|---|---|---|
| 6,457,002 B1 | 9/2002 | Beattie et al. | |
| 7,509,320 B2 | 3/2009 | Hess et al. | |
| 7,693,817 B2 | 4/2010 | Dumais et al. | |
| 8,244,750 B2 | 8/2012 | Gade et al. | |
| 8,473,495 B2 | 6/2013 | Grieselhuber et al. | |
| 8,706,748 B2 | 4/2014 | Herlocker et al. | |
| 2006/0200556 A1 | 9/2006 | Brave et al. | |
| 2006/0282336 A1* | 12/2006 | Huang | G06Q 30/0633 |
| | | | 705/26.61 |
| 2007/0016553 A1 | 1/2007 | Dumais et al. | |

(Continued)

FOREIGN PATENT DOCUMENTS

| | | |
|---|---|---|
| EP | 1825395 A2 | 8/2007 |
| WO | 2005033979 A1 | 4/2005 |
| WO | 2006047654 A2 | 5/2006 |

OTHER PUBLICATIONS

English Abstract for EP1825395A2, published Aug. 29, 2007, 1 p.

(Continued)

*Primary Examiner* — Pierre M Vital
*Assistant Examiner* — Andrew N Ho
(74) *Attorney, Agent, or Firm* — Konrad Raynes Davda & Victor LLP; Janaki K. Davda

(57) ABSTRACT

Provided are techniques for gauging credibility of digital content items. For each digital content item in a list of digital content items, a usage score is identified for each different level of usage and for a user base and the usage score for each different level of usage is added to obtain a total usage score for the digital content item. Each digital content item in the list is ranked using the total score of each digital content item.

15 Claims, 10 Drawing Sheets

(56) References Cited

U.S. PATENT DOCUMENTS

| | | | | |
|---|---|---|---|---|
| 2008/0109740 | A1* | 5/2008 | Prinsen | G06F 3/0486 715/764 |
| 2009/0307168 | A1* | 12/2009 | Bockius | G06F 16/9535 706/46 |
| 2012/0016863 | A1 | 1/2012 | Bernhardt et al. | |
| 2012/0035981 | A1* | 2/2012 | Bedard | G06F 16/9535 705/7.29 |
| 2012/0047150 | A1 | 2/2012 | Spiegel | |
| 2012/0066196 | A1 | 3/2012 | Dempski et al. | |
| 2012/0066233 | A1* | 3/2012 | Fonseka | G06F 16/951 707/749 |
| 2012/0179752 | A1* | 7/2012 | Mosley | G06F 16/951 709/204 |
| 2012/0215773 | A1* | 8/2012 | Si | G06Q 30/02 707/723 |
| 2012/0233161 | A1 | 9/2012 | Xu et al. | |
| 2013/0132384 | A1* | 5/2013 | Bohm | G06F 16/27 707/736 |
| 2013/0132861 | A1* | 5/2013 | Kienzle | G06Q 10/10 715/753 |
| 2013/0185641 | A1* | 7/2013 | Rose | G06F 3/048 715/733 |
| 2013/0246383 | A1 | 9/2013 | White et al. | |
| 2014/0019446 | A1 | 1/2014 | He et al. | |
| 2014/0108427 | A1 | 4/2014 | Spiegel | |
| 2014/0172879 | A1 | 6/2014 | Dubbels et al. | |
| 2014/0181204 | A1 | 6/2014 | Sharp et al. | |
| 2014/0229872 | A1 | 8/2014 | Johnson | |
| 2014/0236943 | A1 | 8/2014 | Li et al. | |

OTHER PUBLICATIONS

Huang, J., R.W. White, G. Buscher, and K. Wang, "Improving Searcher Models Using Mouse Cursor Activity", SIGIR"12, Proceedings of the 35th International ACM SIGIR Conference on Research and Development in Information Retrieval, Aug. 12-16, 2012, Copyright 2012 ACM, 10 pp.

ip.com, "A System and Method of Automatically Rank on Search Result Based on User Active Time and User Profile", Jul. 23, 2012, IPCOM000220103D, can be retrieved at URL: http://ip.com/IPCOM/000220103 , 7 pp.

Mell, P., et al., "Effectively and Securely Using the Cloud Computing Paradigm", NIST, Information Technology Laboratory, Oct. 7, 2009, 80 pp.

Mell, P., et al., "The NIST Definition of Cloud Computing (Draft)", Recommendations of the National Institute of Standards and Technology, Special Publication 800-145 (Draft), Jan. 2011, 7 pp.

Kim, J. and A. Can, "Characterizing Queries in Different Search Tasks", 2012 45th Hawaii International Conference on System Sciences, Jan. 4-7, 2012, © 2012 IEEE, IEEE Computer Society, 10 pp.

U.S. Appl. No. 14/614,042, filed Feb. 4, 2015, 10 pp.

Office Action dated Jan. 25, 2017, pp. 36, for U.S. Appl. No. 14/614,042.

Response dated Apr. 25, 2017, pp. 19, to Office Action dated Jan. 25, 2017, pp. 36, for U.S. Appl. No. 14/614,042.

Final Office Action dated Aug. 10, 2017, pp. 53, for U.S. Appl. No. 14/614,042.

Amendment dated Nov. 8, 2017, pp. 18, to Final Office Action dated Aug. 10, 2017, pp. 53, for U.S. Appl. No. 14/614,042.

Office Action dated Apr. 5, 2018, pp. 55, for U.S. Appl. No. 14/614,042.

Response dated Jul. 5, 2018, pp. 20, to Office Action dated Apr. 5, 2018, pp. 55, for U.S. Appl. No. 14/614,042.

Final Office Action dated Oct. 16, 2018, pp. 54, for U.S. Appl. No. 14/614,042.

Amendment dated Jan. 10, 2019, pp. 13, to Final Office Action dated Oct. 16, 2018, pp. 54, for U.S. Appl. No. 14/614,042.

Office Action dated Apr. 18, 2019, pp. 57, for U.S. Appl. No. 14/614,042.

Response dated Jul. 18, 2019, pp. 14, to Office Action dated Apr. 18, 2019, pp. 57, for U.S. Appl. No. 14/614,042.

Notice of Allowance dated Sep. 5, 2019, pp. 22, for U.S. Appl. No. 14/614,042.

List of IBM Patents and Applications Treated as Related, Nov. 26, 2019, pp. 2.

* cited by examiner

310 — Who were the most influential Impressionist artists?   ✕  ▲  ▼  ↻

Explore

Answers ▼

⑫ Claude Monet  ⊗
⑩ Edgar Degas  ⊗
⑧ Pierre August Renoir  ⊗
⑦ Edouard Manet  ⊗
③ Vincent van Gogh  ⊗
⊕ Add Suggested Questions ▶

350 — Claude Monet: A founder of French Impressionist painting.

Source Breakdown
News — Interviews — Books — Journals
(12)
4/04

Activity
9/13

Recently Viewed
Peter Mann   John Fox   Jaclyn Berman
— 320

The Seine as backdrop to Claude Monet paintings
" Lorem ipsum dolor sit amet, consectetur adipiscing elit. Nulla at velit posuere, tincidunt arcu ut, accumsan metus. Monet phasellus vel blandit est, sit amet bibendum mauris. Vestibulum ornare erat urna, sit amet dignissim leo blandit sed. "
Sept 22, 2013   8:38 am   Quinn Tomlin   www.artistnews.com   94views   view source
•••

Monet Influences new young artists in Spain
"In sodales fermentum nunc, sed tempor nunc venenatis id. Nulla facilisi. Sed at elementum eros. Cras dictum volutpat magna, nec aliquam risus pharetra sed. Claude Monet fusce mollis feugiat tempus. Nunc ut hendrerit lacus. Sed nibh eros, pulvinar quis leo vitae, euismod blandit dolor."
Sept 29, 2013   8:38 am   Terry Beck   www.seine.com   87views   view source Visiting Giverny shows Japanese influence on Claude Monet
"Nullam quis auctor ligula, nec dapibus elit. Duis sit amet sodales nulla. Nulla nec risi vel nulla elementum vestibulum. Pellentesque a nunc vitae dolor facilisis congue. Sed sagittis est a quam aliquam tristique Monet"
Sept 28, 2013   9:32 am   Sandra Pertz   www.mfrancon.com   36views   view source

GAUGING CREDIBILITY OF DIGITAL CONTENT ITEMS

FIELD

Embodiments of the invention relate to gauging credibility of digital content items by tracking different levels of usage by a group of users within a closed secure environment.

BACKGROUND

Hypertext web search engines track usage patterns of a large base of people (e.g., usage patterns such as keyword searches and the links that are clicked on) to ascertain the relevance or quality of the results ("hits") for a search query. This surfaces links that are more popular or trending at a particular point in time, and the popular/trending links surface higher as more users click on them. "Surfaces" may be described as identifying with a search query, prioritizing, increasing in importance, etc.

In closed and secure environments, it may be more difficult to surface relevance or quality of documents for questions of similar context, especially if documents are continuously streaming in and the user base is much smaller. This makes it difficult for internal search engines to surface some documents that are more relevant or important to search queries than other documents.

There are citation trackers that are able to track the number of times documents were cited by other publications.

SUMMARY

Provided is a method for gauging credibility of digital content items. The method comprises, for each digital content item in a list of digital content items, identifying, using a processor of a computer, a usage score for each different level of usage and for a user base and adding the usage score for each different level of usage to obtain a total usage score for the digital content item; and ranking each digital content item in the list using the total score of each digital content item.

Provided is a computer program product for gauging credibility of digital content items. The computer program product comprises a computer readable storage medium having program code embodied therewith, the program code executable by at least one processor to perform: identifying, by the at least one processor, a usage score for each different level of usage and for a user base and adding, by the at least one processor, the usage score for each different level of usage to obtain a total usage score for the digital content item; and ranking, by the at least one processor, each digital content item in the list using the total score of each digital content item.

Provided is a computer system for gauging credibility of digital content items. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: for each digital content item in a list of digital content items, identifying a usage score for each different level of usage and for a user base and adding the usage score for each different level of usage to obtain a total usage score for the digital content item; and ranking each digital content item in the list using the total score of each digital content item.

BRIEF DESCRIPTION OF THE SEVERAL VIEWS OF THE DRAWINGS

Referring now to the drawings in which like reference numbers represent corresponding parts throughout:

FIG. 3 illustrates surfacing digital content items in a search query in screenshot in accordance with certain embodiments.

FIG. 5 illustrates a digital content item being selected for saving in screenshot in accordance with certain embodiments.

FIG. 6 illustrates selection of a portion of a digital content item for highlighting in screenshot in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
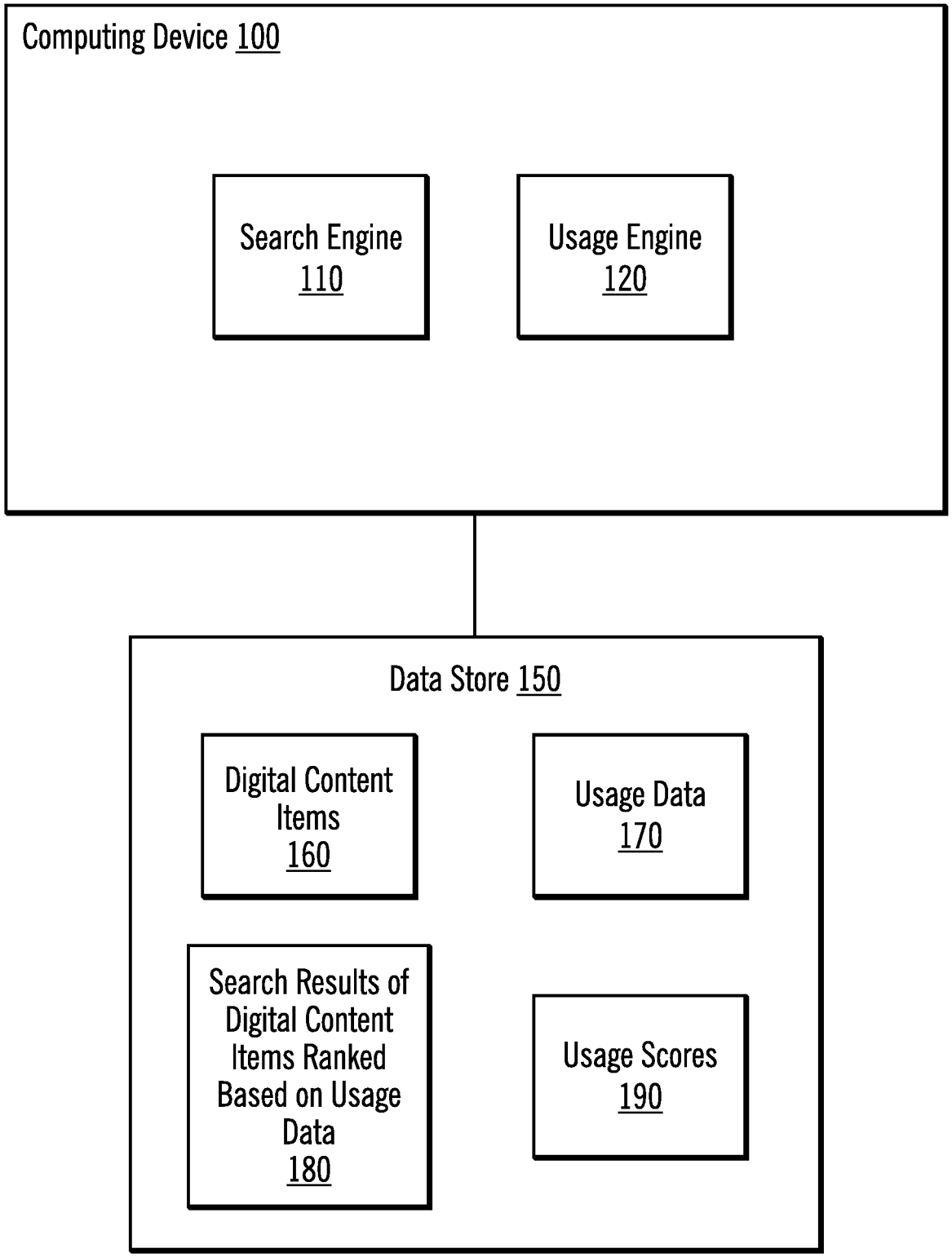
FIG. 1 illustrates, in a block diagram, a computing environment in accordance with certain embodiments.

FIG. 1 illustrates, in a block diagram, a computing environment in accordance with certain embodiments. In the computing environment, a computing device 100 is coupled to a data store 150. The computing device 100 includes a search engine 110 and a usage engine 120. In certain embodiments, the usage engine 120 is separate from the search engine 110. In certain alternative embodiments, the usage engine 120 is part of the search engine 110. The data store 150 includes digital content items 160 (which may be any information, such as, but not limited to, documents, reports, web pages, videos, etc.), usage data 170, search results of digital content items ranked based on usage data 180, and usage scores 190. In certain embodiments, digital content items may also be referred to as "evidence".

With embodiments, the usage engine 120 uses different levels of usage patterns to ascertain the quality of digital content items for specific query contexts. Each of the different levels may be associated with a range of severity.

In certain embodiments, the different levels of usage rank in order of importance from surfacing a digital content item, reading a summarized digital content item (e.g., based on amount of time spent by user after a summary is selected), flagging/saving a digital content item (e.g., based on a user selecting an operation for flagging or an operation for saving), reading a digital content item entirely (e.g., based on user selecting the digital content item and based on an amount of time spent by the user after the digital content item is selected), marking (e.g., highlighting/commenting on/adding answer to) a digital content item (e.g., based on user selecting an operation for highlighting, commenting or adding an answer), and citing a digital content item in another digital content item (e.g., a report). In certain embodiments, the usage engine 120 determines that the digital content item was cited in another digital content item based on the digital content item being physically saved within a project or case (e.g., in a folder or bucket system). In other embodiments, the usage engine 120 determines that the digital content item was cited in another digital content item by determining that a tool (e.g., a citation tracker) was used to create the citation to the digital content item. In certain embodiments, the usage engine 120 determines that the digital content item was cited in another digital content item based on a text document tool with a plug-in for adding the citation being used to add the digital content items as a citation. In yet other embodiments, the usage engine 120 mines sections (e.g., bibliographic sections) of digital content items to identify citations, and this may be done in embodiments in which related digital content items are placed within a same, closed, secure. These different levels of usage may be used to ascertain the quality or relevance of digital content items within any user base (e.g., a smaller user base). For example, users may see the digital content items (e.g., reports) that senior members of a company or specific experts in a field have read or referenced to gauge quality or importance of the digital content items.

With embodiments, when a user submits a search query for digital content items to the search engine 110, the search engine 110 works in conjunction with the usage engine 120 to rank digital content items that have higher levels of usage higher in a list of search results.

Figure 2:
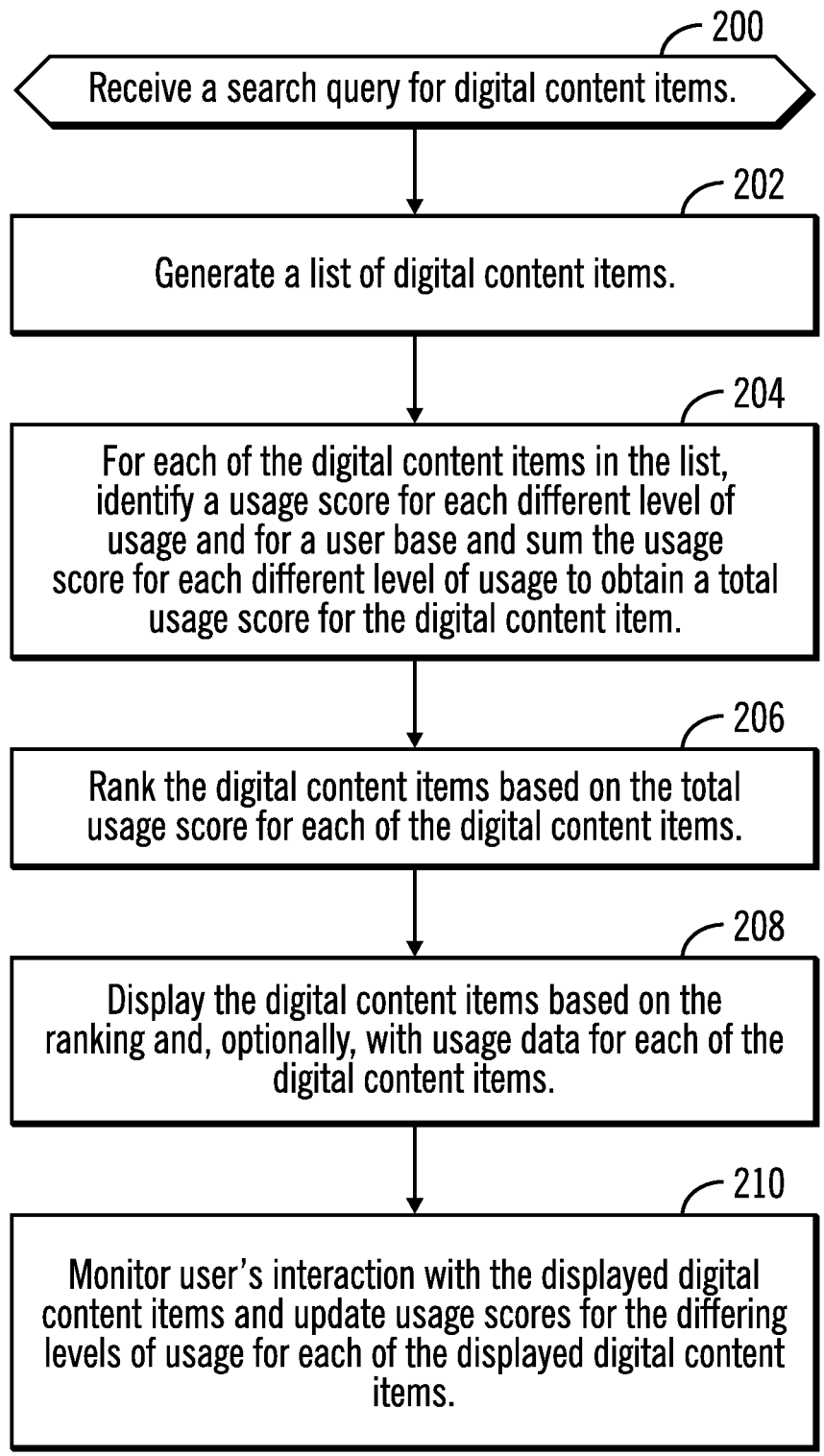
FIG. 2 illustrates, in a flow diagram, operations for gauging credibility of digital content items in accordance with certain embodiments.

FIG. 2 illustrates, in a flow diagram, operations for gauging credibility of digital content items in accordance with certain embodiments. Control begins at block 200 with the search engine 110 receiving a search query for digital content items. In block 202, the search engine 110 generates a list of digital content items. In certain embodiments, execution of the search query starts the usage engine 120 based on previous queries, pulls the digital content and their associated usage scores, and presents the digital content to the user in ranked form. In block 204, the usage engine 120, for each of the digital content items in the list, (1) identifies a usage score for each different level of usage (e.g., surfacing a digital content item, reading a summarized digital content item, flagging/saving a digital content item, reading an digital content item entirely, marking (e.g., highlighting/commenting on/adding an answer to) a digital content item, and citing a digital content item in another digital content item) and for a user base and (2) sums the usage score for each different level of usage to obtain a total usage score for the digital content item. In certain embodiments, a user may select the differing levels to be used. In certain embodiments, the user may select the differing levels to be used after their queries have been registered. In certain embodiments, the user may select the user base (e.g., only bosses, only experts in a field, everyone on-line, etc. In block 206, the usage engine 120 ranks the digital content items based on the total usage score for each of the digital content items. In certain embodiments, a digital content item with a higher score is ranked higher than a digital content item with a lower score. In certain embodiments, the search engine 110 pulls the ranked digital content items and their usage scores from the usage engine 120. In block 208, the search engine 110 displays the digital content items based on the ranking and, optionally, with usage data for each of the digital content items. In block 210, the usage engine 120 monitors a user's interaction with the displayed digital content items and updates usage scores for the differing levels of usage for each of the displayed digital content items.

With the monitoring of differing levels of usage and assignment of scores, embodiments enable gauging credibility of digital content items. For example, digital content items with higher scores may be thought of as more credible/useful/etc.

Thus, in certain embodiments, a digital content item has a usage score for each of the differing levels of usage (e.g., if there are 5 differing levels of usage, then, the digital content item has 5 usage scores). The usage score for a particular level of usage may be based on the usage patterns of the user base. In certain embodiments, people who are renowned in a specific field and use digital content items in that field may have multipliers on the usage scores (e.g., to increase the usage score if an expert in a field used the digital content item for a particular usage level, such as citing the digital content item in another digital content item).

The usage engine 120 monitors each interaction with the digital content item for the differing levels and continues to adjust usage scores associated with (e.g., tagged to) the digital content item. Then, when a search query for a context is done, those differing levels of usage may serve as an added form of quality or importance of the digital content item.

For example, there is a senior researcher who surfaces 10 digital content items, reads the abstract of 5 digital content items, saves 4 digital content items, reads 3 digital content items completely, highlights 2 digital content items, and cites 1 digital content item in a final report. All those different levels of usage are tracked and scored so that future related search queries may be able to show these levels of usage along with search results.

FIGS. 3-7 illustrate example screenshots in accordance with certain embodiments. FIG. 3 illustrates surfacing digital content items in a search query in screenshot 300 in accordance with certain embodiments. In FIG. 3, in response to a search query 310 being received, a list of search results 320 are displayed. In addition, in FIG. 3, some usage data 350 is displayed that shows the consolidation of all the digital content items within the answer to the search query. Each digital content item has associated usage scores that may be displayed for the user directly or that may be provided via, for example, a link that is selected by the user to obtain the usage scores. In particular, the usage data 350 indicates sources for the digital content items, a graph of activity that shows the recency of the digital content items that are contained within this answer so as to gauge whether the digital content items or newer or older), and some users who have recently reviewed the digital content items.

Figure 4:
FIG. 4 illustrates a summary of a digital content item being selected for reading in screenshot in accordance with certain embodiments.

FIG. 4 illustrates a summary of a digital content item being selected for reading in screenshot 400 in accordance with certain embodiments. In FIG. 4, a user has selected a summary of digital content item 410 ("The Seine as backdrop to Claude Monet paintings").

Figure 5:
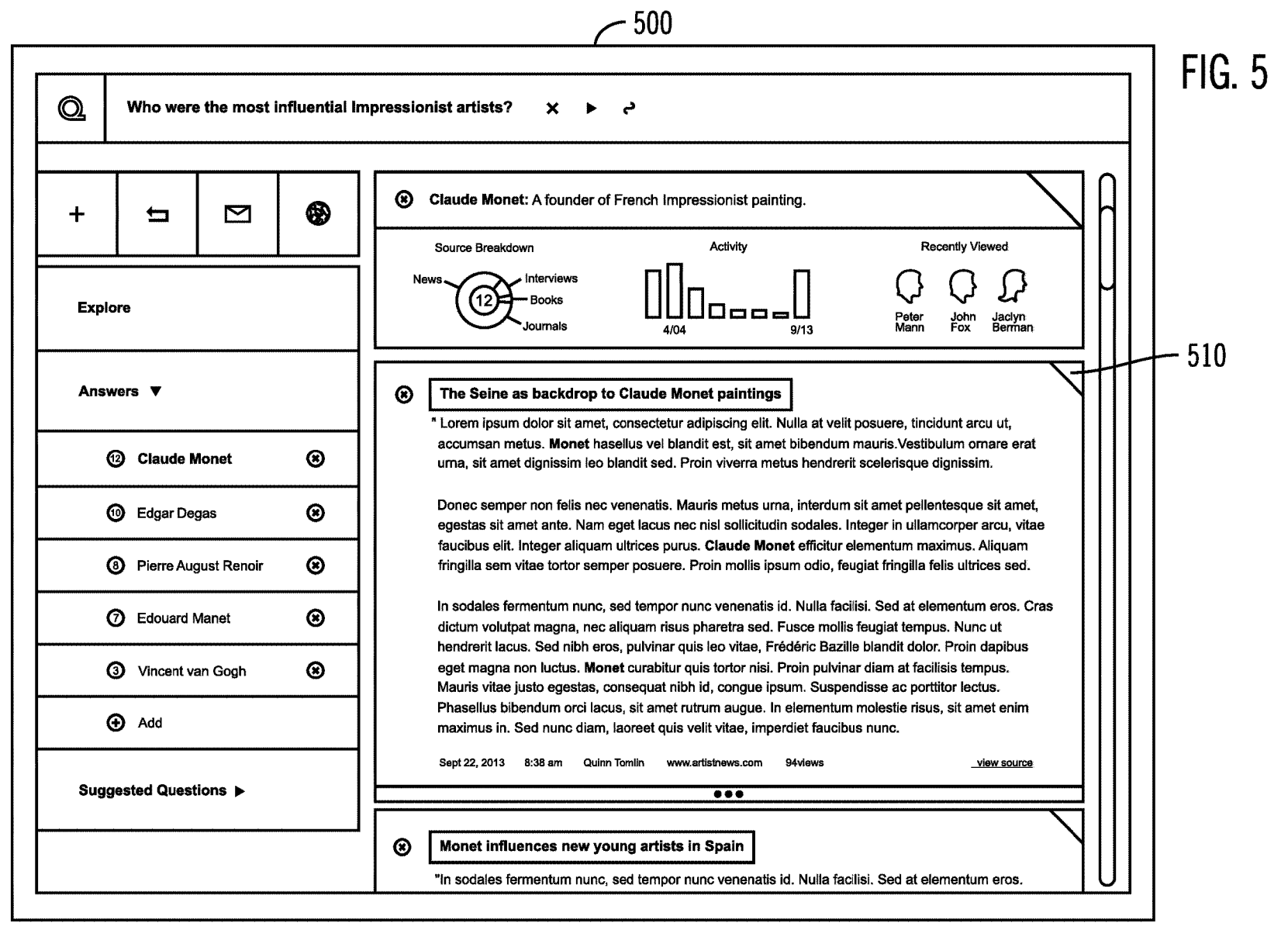

FIG. 5 illustrates a digital content item 510 being selected for saving in screenshot 500 in accordance with certain embodiments. Although this is an example of saving, a user may also select the digital content item for flagging (which is shown by the "fold over" (or "dog ear") in the corner).

Figure 6:
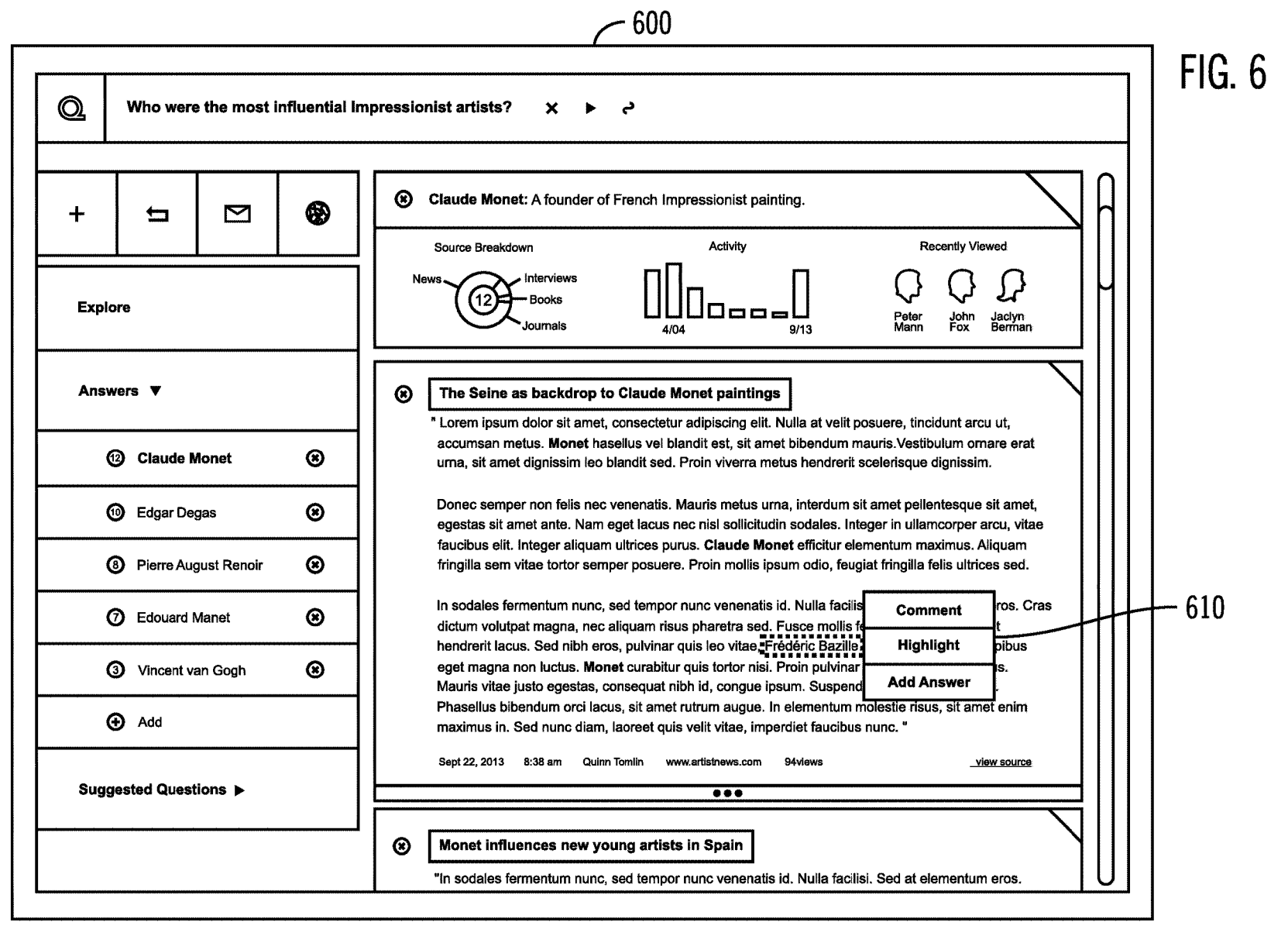

FIG. 6 illustrates selection of a portion of a digital content item for highlighting in screenshot 600 in accordance with certain embodiments. In FIG. 6, a user is presented with the options to "Comment", "Highlight" or "Add Answer" 610. In this example, a user has highlighted a portion of the digital content item (Frederic Bazille).

Figure 7:
FIG. 7 illustrates citing of a digital content item in a document in screenshot in accordance with certain embodiments.

FIG. 7 illustrates citing of a digital content item in a document in screenshot 700 in accordance with certain embodiments. With FIG. 7, in response to user selection of "Save Evidence" 704, "Save with Question & Answer set" 706, and the "Save" button 710, the usage engine 120 saves the search request (i.e., the question), the search results (i.e., the answer set), and the digital content items to a particular project or case, such as "Influential Artists/19$^{th}$ Century/Impressionism" 712. In certain embodiments, when the "Save" button 710 is selected, the usage engine 120 determines that the digital content items are slated to be used as citations.

Unlike existing citation trackers, embodiments are able to identify another digital content item that was read, but not used or another digital content item that had highlighted segments that were eventually not used in a final publication. Embodiments use the different levels of usage to surface greater relevance or quality of digital content items to context specific queries.

Embodiments show how a select group of experts have used a digital content item in the past (and other metrics) to help other users gauge the credibility of a the digital content item that they have found with a search query. Embodiments showing how credible/useful a digital content item is by showing users how that digital content item has been used in the past.

Embodiments aggregate a context specific set of actions from multiple users to help another user judge the usefulness of a digital content item.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
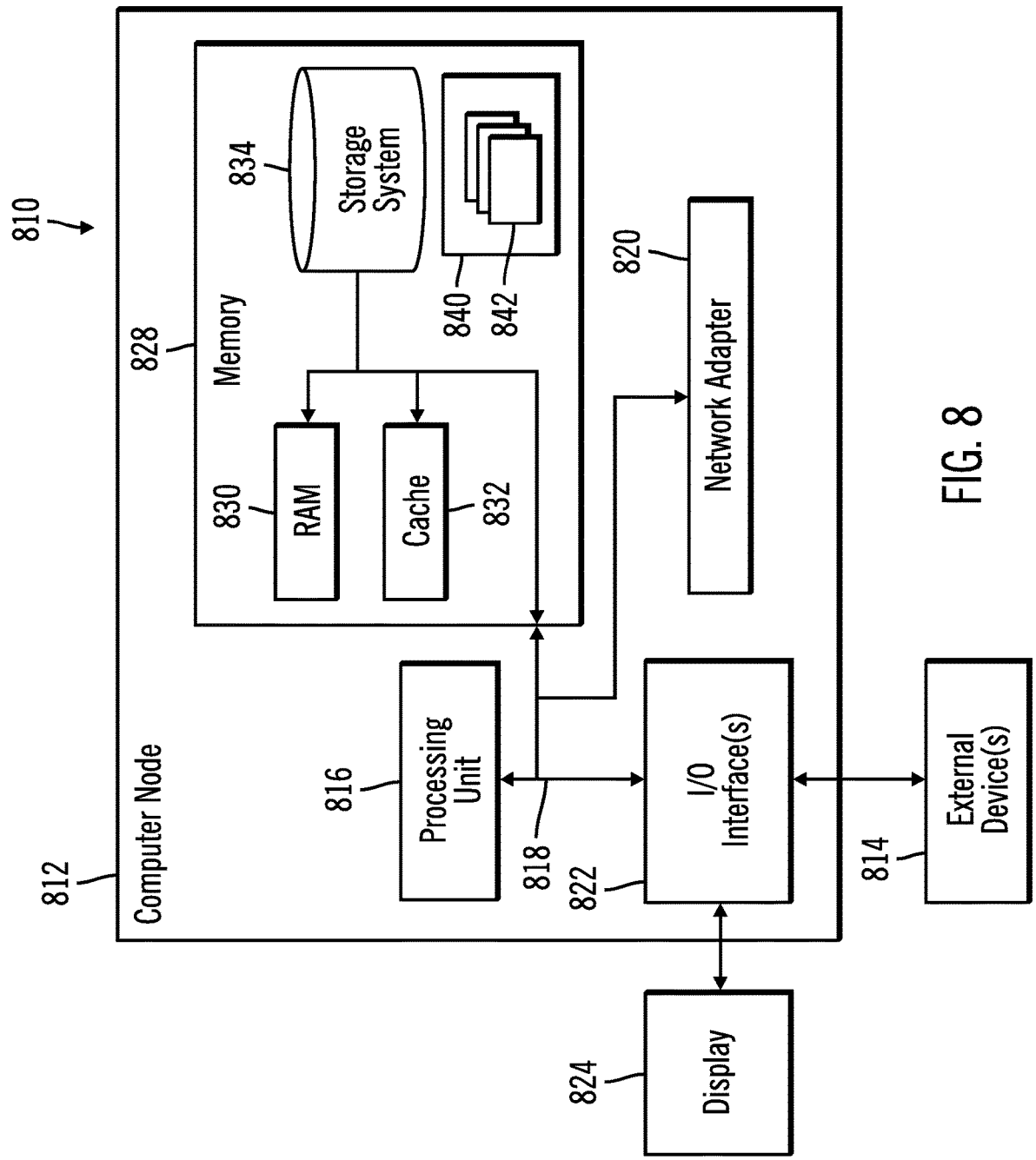
FIG. 8 illustrates a cloud computing node in accordance with certain embodiments.

Referring now to FIG. 8, a schematic of an example of a cloud computing node is shown. Cloud computing node 810 is only one example of a suitable cloud computing node and is not intended to suggest any limitation as to the scope of use or functionality of embodiments of the invention described herein. Regardless, cloud computing node 810 is capable of being implemented and/or performing any of the functionality set forth hereinabove.

In cloud computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in cloud computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Figure 9:
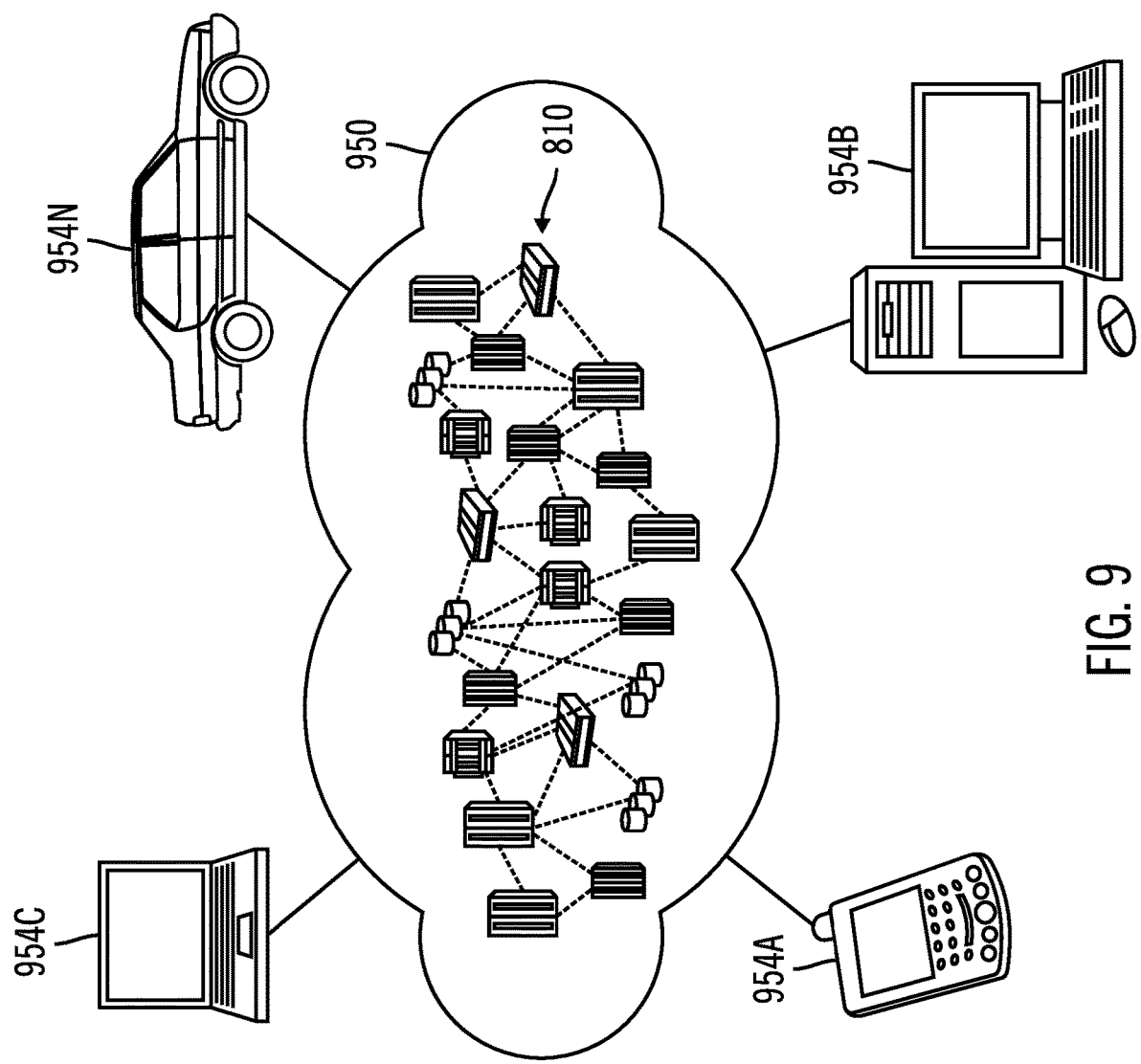
FIG. 9 illustrates a cloud computing environment in accordance with certain embodiments.

Referring now to FIG. 9, illustrative cloud computing environment 950 is depicted. As shown, cloud computing environment 950 comprises one or more cloud computing nodes 810 with which local computing devices used by cloud consumers, such as, for example, personal digital assistant (PDA) or cellular telephone 954A, desktop computer 954B, laptop computer 954C, and/or automobile computer system 954N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 810 and cloud computing environment 950 can communicate with any type of computerized device over any type of network and/or network addressable connection (e.g., using a web browser).

Figure 10:
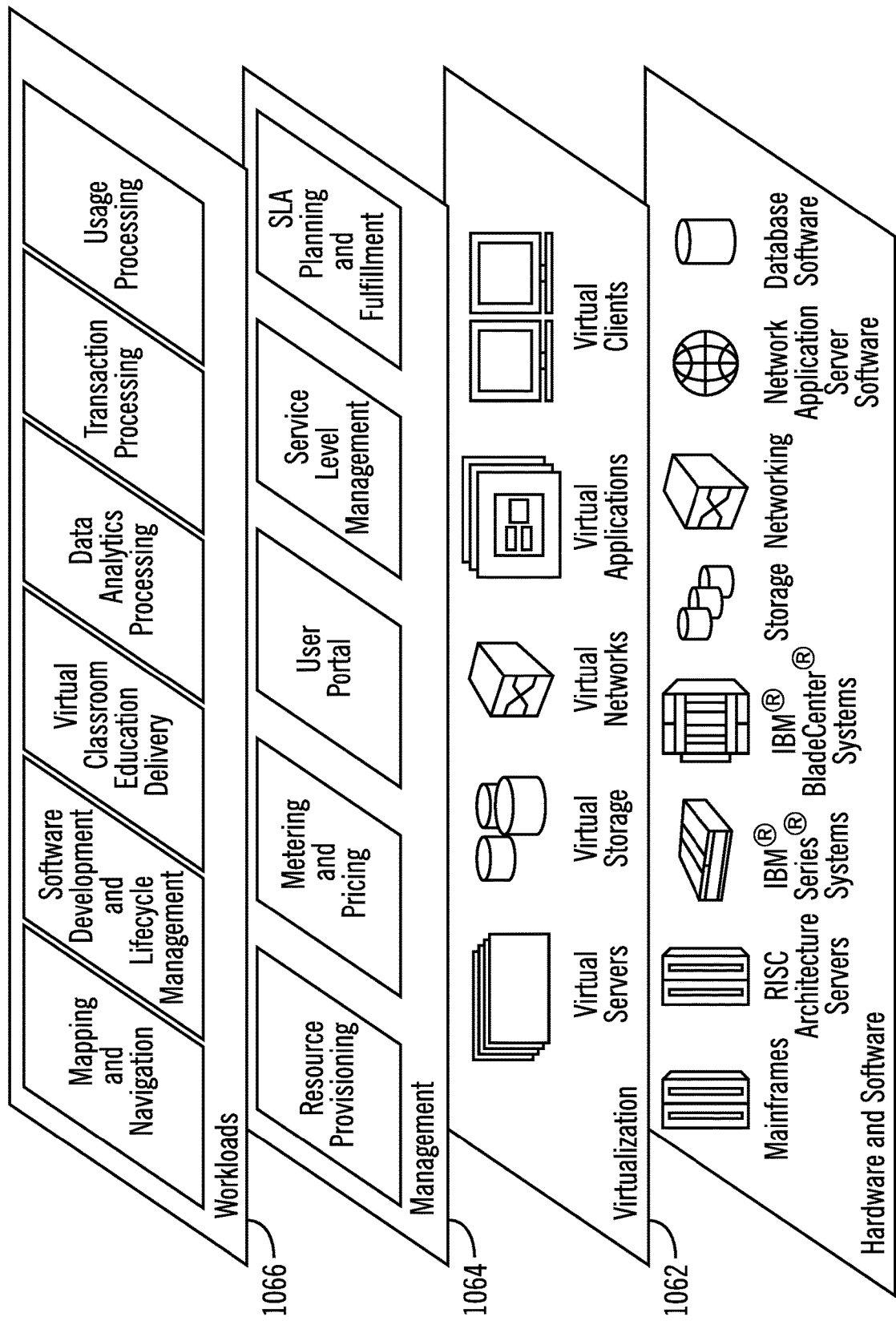
FIG. 10 illustrates abstraction model layers in accordance with certain embodiments.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1062 provides an abstraction layer from which the following examples of virtual entities may be provided: virtual servers; virtual storage; virtual networks, including virtual private networks; virtual applications and operating systems; and virtual clients.

In one example, management layer 1064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1066 provides examples of functionality for which the cloud computing environment may be utilized. Examples of workloads and functions which may be provided from this layer include: mapping and navigation; software development and lifecycle management; virtual classroom education delivery; data analytics processing; transaction processing; and usage processing.

Thus, in certain embodiments, software or a program, implementing usage processing in accordance with embodiments described herein, is provided as a service in a cloud environment.

In certain embodiments, the computing device 100 has the architecture of computing node 810. In certain embodiments, the computing device 100 is part of a cloud environment. In certain alternative embodiments, the computing device 100 is not part of a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising operations for:
    in response to receiving a search query, generating, using a processor of a computer, a list of digital content items;
    for each digital content item in the list of digital content items, adding, using the processor of the computer, a usage score for each different level of usage of different levels of usage to obtain a total usage score for the digital content item;
    ranking, using the processor of the computer, each digital content item using the total usage score for each digital content item;
    providing, using the processor of the computer, a response to the search query by:
        displaying, using the processor of the computer, on a screen, each digital content item according to the ranking and with a summary for each digital content item;
        displaying, using the processor of the computer, on the screen, a bar graph of activity that shows recency of the digital content items;
        displaying, using the processor of the computer, on the screen, a chart with sources for the digital content items and a source breakdown, wherein the sources comprise news, interviews, and books, wherein the chart indicates a number of the sources, and
        displaying, using the processor of the computer, on the screen, images of a subset of users who have recently reviewed at least one of the digital content items;
    in response to receiving selection of the digital content item, displayed on the screen, and an operation comprising save with question and answer set, saving, using the processor of the computer, the search query and the digital content items to a project; and
    in response to receiving selection of the digital content item, displayed on the screen, and an operation comprising save, determining, using the processor of the computer, that the digital content item is a citation.

2. The computer-implemented method of claim 1, further comprising operations for:
    monitoring, using the processor of the computer, interactions with each digital content item that is displayed; and
    in response to the monitoring, updating, using the processor of the computer, the usage score for each of the different levels of usage for each digital content item that is displayed.

3. The computer-implemented method of claim 1, wherein the different levels of usage are selected from a group comprising: surfacing a particular digital content item, reading a summarized digital content item in response to selection of a particular summary, any of flagging and saving the digital content item, reading the digital content item entirely in response to selection of the digital content item, marking the digital content item to provide a comment, and citing the digital content item in another digital content item.

4. The computer-implemented method of claim 1, further comprising operations for:
    receiving, using the processor of the computer, selection of a user base from a plurality of user bases, wherein the usage score is based on the user base.

5. The computer-implemented method of claim 1, wherein a Software as a Service (SaaS) is configured to perform the operations of the computer-implemented method.

6. A computer program product, the computer program product comprising a computer readable storage medium having program code embodied therewith, the program code executable by at least one processor to perform operations for:
    in response to receiving a search query, generating a list of digital content items;

for each digital content item in the list of digital content items, adding a usage score for each different level of usage of different levels of usage to obtain a total usage score for the digital content item;

ranking each digital content item using the total usage score for each digital content item;

providing a response to the search query by:
  displaying, on a screen, each digital content item according to the ranking and with a summary for each digital content item;
  displaying, on the screen, a bar graph of activity that shows recency of the digital content items;
  displaying, on the screen, a chart with sources for the digital content items and a source breakdown, wherein the sources comprise news, interviews, and books, wherein the chart indicates a number of the sources, and
  displaying, on the screen, images of a subset of users who have recently reviewed at least one of the digital content items;

in response to receiving selection of the digital content item, displayed on the screen, and an operation comprising save with question and answer set, saving the search query and the digital content items to a project; and in response to receiving selection of the digital content item, displayed on the screen, and an operation comprising save, determining that the digital content item is a citation.

7. The computer program product of claim 6, wherein the program code is executable by the at least one processor to perform operations for:
  monitoring interactions with each digital content item that is displayed; and
  in response to the monitoring, updating the usage score for each of the different levels of usage for each digital content item that is displayed.

8. The computer program product of claim 6, wherein the different levels of usage are selected from a group comprising: surfacing a particular digital content item, reading a summarized digital content item in response to selection of a particular summary, any of flagging and saving the digital content item, reading the digital content item entirely in response to selection of the digital content item, marking the digital content item to provide a comment, and citing the digital content item in another digital content item.

9. The computer program product of claim 6, wherein the program code is executable by the at least one processor to perform operations for:
  receiving selection of a user base from a plurality of user bases, wherein the usage score is based on the user base.

10. The computer program product of claim 6, wherein a Software as a Service (SaaS) is configured to perform the operations of the computer program product.

11. A computer system, comprising:
  one or more processors, one or more computer-readable memories and one or more computer-readable, tangible storage devices; and
  program instructions, stored on at least one of the one or more computer-readable, tangible storage devices for execution by at least one of the one or more processors via at least one of the one or more computer-readable memories, to perform operations comprising:
    in response to receiving a search query, generating a list of digital content items;
    for each digital content item in the list of digital content items, adding a usage score for each different level of usage to obtain a total usage score of different levels of usage for the digital content item;
    ranking each digital content item using the total usage score for each digital content item;
    providing a response to the search query by:
      displaying, on a screen, each digital content item according to the ranking and with a summary for each digital content item;
      displaying, on the screen, a bar graph of activity that shows recency of the digital content items;
      displaying, on the screen, a chart with sources for the digital content items and a source breakdown, wherein the sources comprise news, interviews, and books, wherein the chart indicates a number of the sources, and
      displaying, on the screen, images of a subset of users who have recently reviewed at least one of the digital content items;
    in response to receiving selection of the digital content item, displayed on the screen, and an operation comprising save with question and answer set, saving the search query and the digital content items to a project; and
    in response to receiving selection of the digital content item, displayed on the screen, and an operation comprising save, determining that the digital content item is a citation.

12. The computer system of claim 11, wherein the operations further comprise:
  monitoring interactions with each digital content item that is displayed; and
  in response to the monitoring, updating the usage score for each of the different levels of usage for each digital content item that is displayed.

13. The computer system of claim 11, wherein the different levels of usage are selected from a group comprising: surfacing a particular digital content item, reading a summarized digital content item in response to selection of a particular summary, any of flagging and saving the digital content item, reading the digital content item entirely in response to selection of the digital content item, marking the digital content item to provide a comment, and citing the digital content item in another digital content item.

14. The computer system of claim 11, wherein the operations further comprise:
  receiving selection of a user base from a plurality of user bases, wherein the usage score is based on the user base.

15. The computer system of claim 11, wherein a Software as a Service (SaaS) is configured to perform the operations of the computer system.

* * * * *